United States Patent
Muehllehner et al.

[11] Patent Number: 5,744,802
[45] Date of Patent: Apr. 28, 1998

[54] IMAGE GENERATION FROM LIMITED PROJECTIONS IN POSITRON EMISSION TOMOGRAPHY USING MULTI-SLICE REBINNING

[75] Inventors: Gerd Muehllehner, Wayne, Pa.; Peter Countryman, Oakland; William K. Braymer, Pleasanton, both of Calif.

[73] Assignee: ADAC Laboratories, Milpitas, Calif.

[21] Appl. No.: 547,951

[22] Filed: Oct. 25, 1995

[51] Int. Cl.$^6$ .................................................. G01T 1/166
[52] U.S. Cl. .................... 250/363.03; 250/363.04; 378/901
[58] Field of Search ................. 250/363.02, 363.03, 250/363.04, 370.09; 378/901; 364/413.13, 413.24

[56] References Cited

U.S. PATENT DOCUMENTS

| | | | |
|---|---|---|---|
| 4,075,492 | 2/1978 | Boyd et al. | 250/445 |
| 5,046,003 | 9/1991 | Crawford | 364/413.15 |
| 5,170,346 | 12/1992 | Crawford et al. | 364/413.16 |
| 5,233,518 | 8/1993 | King et al. | 364/413.18 |
| 5,270,923 | 12/1993 | King et al. | 364/413.13 |
| 5,331,553 | 7/1994 | Muehllehner et al. | 364/413 |
| 5,486,700 | 1/1996 | Silberklang et al. | 250/363.04 |
| 5,554,848 | 9/1996 | Hermony et al. | 350/363.05 |

OTHER PUBLICATIONS

Robert M. Lewitt, et al., *Three–Dimensional Image Reconstruction for PET by Multi–Slice Rebinning and Axial Image Filtering*, Phys. Med. Biol. 39 (1994) pp. 321–339, Printed in the UK.

Margaret E. Daube–Witherspoon, et al., *Treatment of Axial Data in Three–Dimensional PET*, The Journal of Nuclear Medicine, vol. 28. pp. 1717–1724, Nov., 1987.

P. E. Kinahan, et al., *Analytic 3D Image Reconstruction Using All Detected Events*, IEEE Transactions on Nuclear Science, vol. 36, No. 1, pp. 964–968, Feb., 1989.

Margaret E. Daube–Witherspoon, et al. *An Iterative Image Space Reconstruction Algorithym Suitable for Volume ECT*, IEEE Transactions on Medical Imaging, vol. MI–5, No. 2, pp. 61–66, Jun. 1986.

*Primary Examiner*—David P. Porta
*Assistant Examiner*—David Vernon Bruce
*Attorney, Agent, or Firm*—Blakely, Sokoloff Taylor & Zafman LLP

[57] ABSTRACT

A method of reconstructing an image in a medical imaging system comprises the steps of detecting transverse rays and oblique rays using a limited range of projection angles. The limited range of projection angles is achieved by either limiting the range of rotation of the detectors at each position along the z axis, or by causing the detectors to trace a continuous-motion helical path along the z axis. Data is then rebinned to create a stack of partially-complete sinograms corresponding to individual transverse slice images corresponding to, in the aggregate, a three-dimensional image. Because of the limited projection angles, each sinogram represents an incomplete data set. The rebinning includes, for each oblique ray, identifying among the sinograms the images intersected by the ray, and, applying to each of the sinograms associated with the images intersected by the ray an increment that is representative of the ray. A two-dimensional iterative reconstruction algorithm is applied to each partial sinogram in order to reconstruct a three-dimensional image slice-by-slice, followed or preceded by axially filtering to reduce blurring in the z direction.

30 Claims, 12 Drawing Sheets

FIG. 2
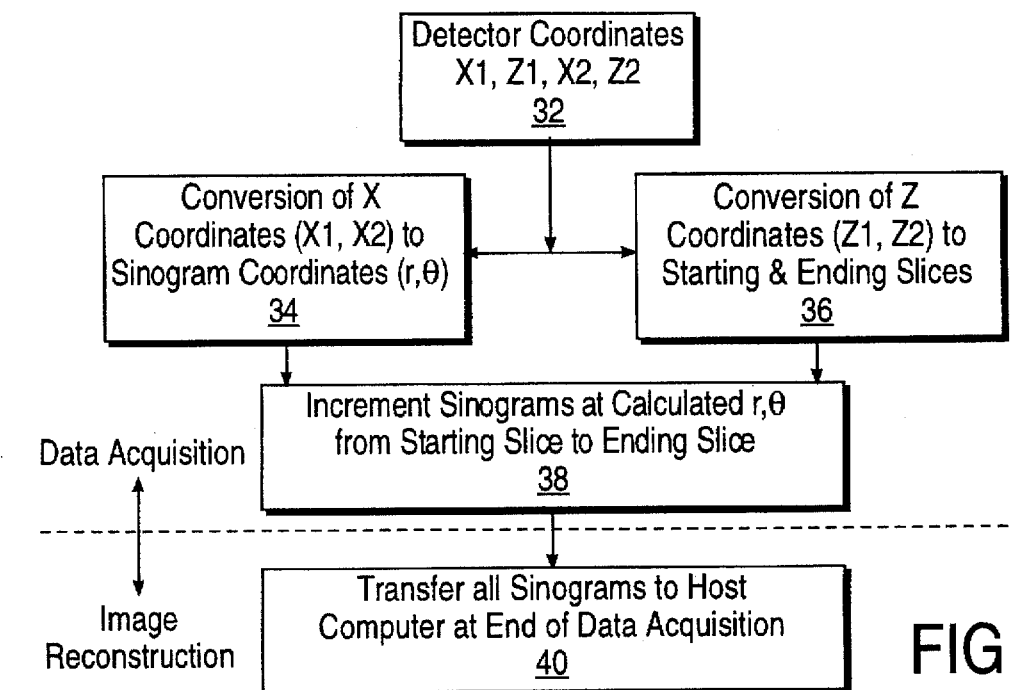
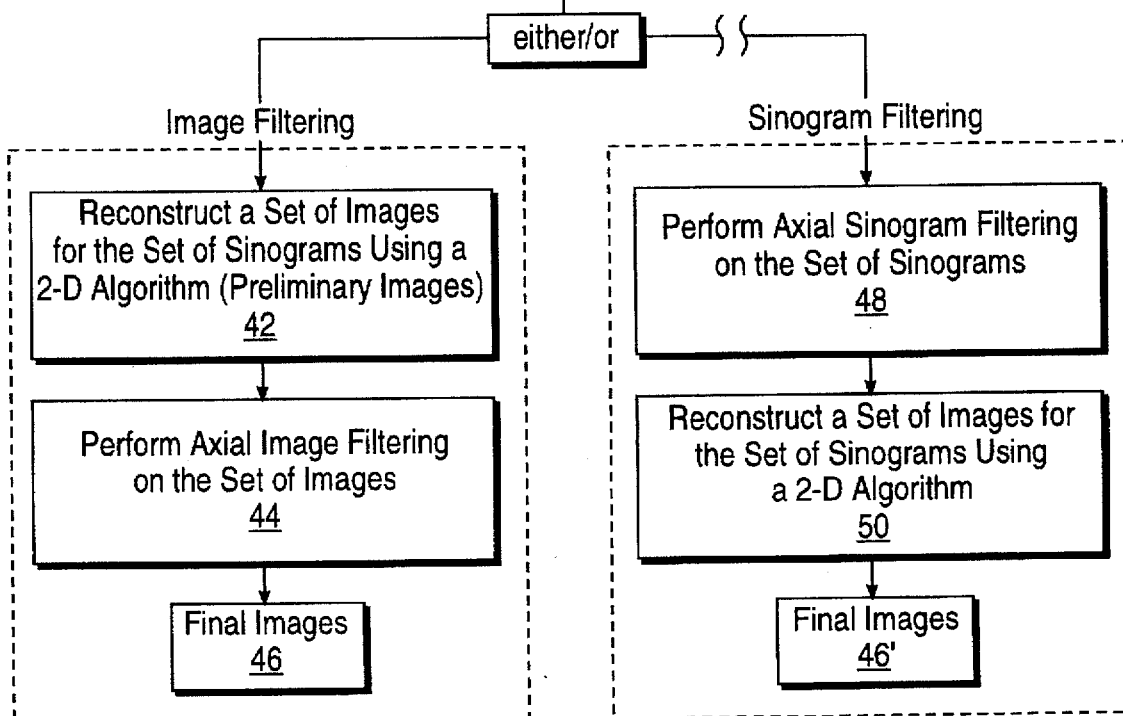
FIG. 2a

1

IMAGE GENERATION FROM LIMITED PROJECTIONS IN POSITRON EMISSION TOMOGRAPHY USING MULTI-SLICE REBINNING

FIELD OF THE INVENTION

The present invention pertains to the field of medical imaging. More particularly, the present invention relates to image reconstruction in positron emission tomography (PET) using limited projections.

BACKGROUND OF THE INVENTION

In medical imaging techniques known as emission computed tomography, images of an object are created based on the detection of gamma rays emitted from the object. In positron emission tomography (PET), positron-electron annihilations within the object to be imaged cause gamma rays to be emitted in pairs of two gamma rays directed 180 degrees apart. The paths formed by each pair of gamma rays represents a line which is sometimes referred to as a "line of coincidence". The specific locations of structures within the object can be determined by calculating the positions of these lines of coincidence.

Two significant design concerns relating to PET systems are the cost of the imaging equipment and the time required to collect raw data. One solution to minimizing the time required to reconstruct image data is to surround the patient with large, stationary detectors that subtend all projection angles simultaneously in the transverse plane (the plane perpendicular to the longitudinal axis, or z axis, of the field of view). However, large detectors can be quite costly. Another solution is to detect emissions in only a portion of the projection angles at a time by using smaller detectors that are rotated around the z axis. This approach reduces equipment cost but increases the time required to collect the data. Hence, it is desirable to have a technique which reduces the time required to collect data without increasing equipment cost.

Additional concerns with existing PET systems include the accuracy of the method for reconstructing images from raw data and the computation time required to perform such reconstruction. In PET imaging, lines of coincidence are not limited to planes which are perpendicular to the z axis of the field of view (i.e., transverse planes); in fact, most such lines of coincidence are oblique with respect to the transverse planes. Hence, image reconstruction methods in PET systems should be designed to accommodate this three-dimensional nature of the emitted gamma rays. Several methods have been used to reconstruct such 3-D data, including both iterative and non-iterative approaches. The "single-slice rebinning" approach, for example, assigns each coincidence line to a particular two-dimensional "sinogram". Single-slice rebinning, however, has the disadvantage of having to use certain geometric approximations. Certain "fully 3-D" reconstruction methods avoid geometric approximations, but are computationally intensive and require substantial processing time.

Hence, what is needed is an image reconstruction technique for a PET system which has the accuracy of a fully 3-D approach while reducing computation time. Further, it is desirable that such a technique also reduce the time required to collect raw data without increasing equipment cost.

SUMMARY OF THE INVENTION

A method is provided of reconstructing an image in a medical imaging system. Detectors are provided which are used to detect transverse rays and oblique rays. The detected rays are then converted to a collection of data representative of the detected rays. The data is then rebinned to create a stack of two-dimensional data sets corresponding to individual transverse slice images, wherein the slice images signify in the aggregate a three-dimensional image. Detection of the rays is performed such that, for each data set, the data included in that data set represents less than all of the possible projection angles for the slice image to which that data set corresponds. A two-dimensional iterative reconstruction algorithm is applied to each of the data sets in order to reconstruct a three-dimensional image, slice-by-slice, from the data sets. Further, axially filtering is performed upon the rebinned data.

In an embodiment of the present invention, the step of rebinning the data comprises the steps of, for each oblique ray, identifying among the transverse data sets the images intersected by the ray, and, applying to each of the data sets associated with the images intersected by the ray an increment that is representative of the ray.

Use of limited projection angles is implemented by, in one embodiment, performing a first scan pass such that the detectors are not rotated around the z axis. In another embodiment, the use of limited projection angles is implemented by performing the first scan pass such that the detectors trace a helical path along the z axis.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 2 is a block diagram illustrating the sequences of steps involved in data acquisition and image reconstruction in accordance with the invention.

FIG. 2a is a partial block diagram, illustrating an alternative sequence of steps of image reconstruction in accordance with the invention.

DETAILED DESCRIPTION

Methods and apparatus are described for image generation from limited projections for positron emission tomography (PET) using multi-slice rebinning. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
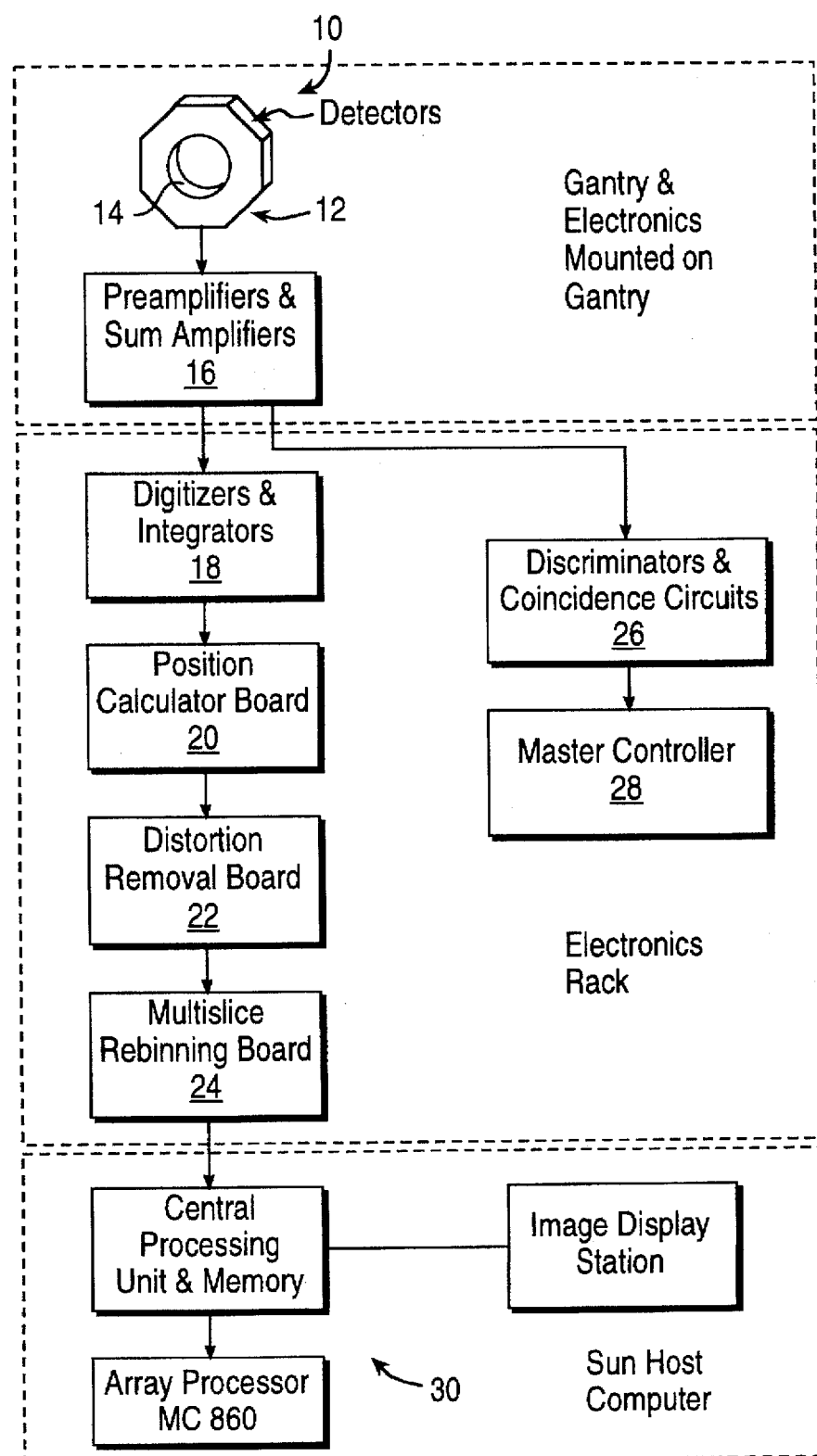
FIG. 1 is a block diagram of an imaging system using the image reconstruction techniques of the present invention.

FIG. 1 shows a simplified block diagram depicting data acquisition and processing in an imaging system using the present invention. The imaging system 10 includes a gantry 12, which houses a hexagonal array of detectors described in greater detail below. The gantry 12 has a central opening 14 in which a subject to the imaged may be positioned. Associated with the gantry 12 may be electronic circuitry 16, typically consisting of preamplifiers and summing amplifiers, which receive and initially condition raw analog coincidence data provided by the detectors. The output of the circuitry 16 associated with the gantry 12 is supplied to digitizers and integrators 18 of types familiar to those skilled in the art, and the resulting signal is in turn applied to a board 20, whose circuitry serves to calculate the position of the positron source and reorganize the data into desired data sets, such as sinograms. A board 22 receives the output of the position calculation board 20, and serves to remove distortion in accordance with known algorithms. The resulting data is applied to a board 24 at which is performed the multi-slice rebinning operation described in detail below. The preamplifiers and summing amplifiers 16 also supply discriminators and coincidence circuits 26, which select those gamma-rays found in coincidence and which are therefore attributed to annihilation events, and a master controller 28, which controls the processing of the coincidence system. In a currently preferred embodiment of the invention, the digitizers and integrators 18, position calculator board 20, distortion removal board 22, multi-slice rebinning board 24, discriminators and coincidence circuits 26 and master controller 28 are all physically associated with an electronics rack, not shown.

Associated with a host computer 30 are a central processing unit (CPU) and memory. An array processor and image display station are also associated with the host computer 30.

FIG. 2 provides a flowchart for data acquisition and image reconstruction in accordance with the invention. The steps and operations depicted in FIG. 2 are described in greater detail below.

Referring now to FIG. 2, in the data acquisition aspect of the process, the coordinates $x_1, z_1$ $x_2, z_2$ for the ends of a ray are sensed, at step 32. The x coordinates $(x_1, x_2)$ are then converted, at step 34, to other convenient data sets, such as, for example, sinogram coordinates $(r, \theta)$. The z coordinates $(z_1, z_2)$ representing the end points are correlated and converted, at step 36, to starting and ending slices traversed by the ray. Next, the data sets (here, sinograms) are incremented, at step 38, using the multi-slice rebinning technique described elsewhere in this specification, for the slices traversed by the ray.

After completion of data acquisition as above, image reconstruction is performed. In the preferred embodiment, the sinograms are transferred, at step 40, to the host computer 30; reconstruction is then performed during one of two alternatives sequences. In one alternative, depicted in FIG. 2 and referred to for convenience as "image filtering", preliminary images are reconstructed from the set of sinograms, at step 42, and axial filtering (step 44) is thereafter performed to yield a final image, at step 46. In the other alternative approach, depicted in FIG. 2a, axial filtering is performed on the set of sinograms, at step 48, prior to reconstruction of a set of images. This approach may be referred to as "sinogram filtering". A set of images may then be reconstructed, as at step 50, to yield final image 46'. Specific methods of reconstruction are discussed in greater detail below.

A common method for compressing coincidence data in an imaging is to reorganize, or "rebin", the data into a stack of arrays of projection data, or sinograms, with projection data matrices corresponding to parallel slices through the object.

Figure 3:
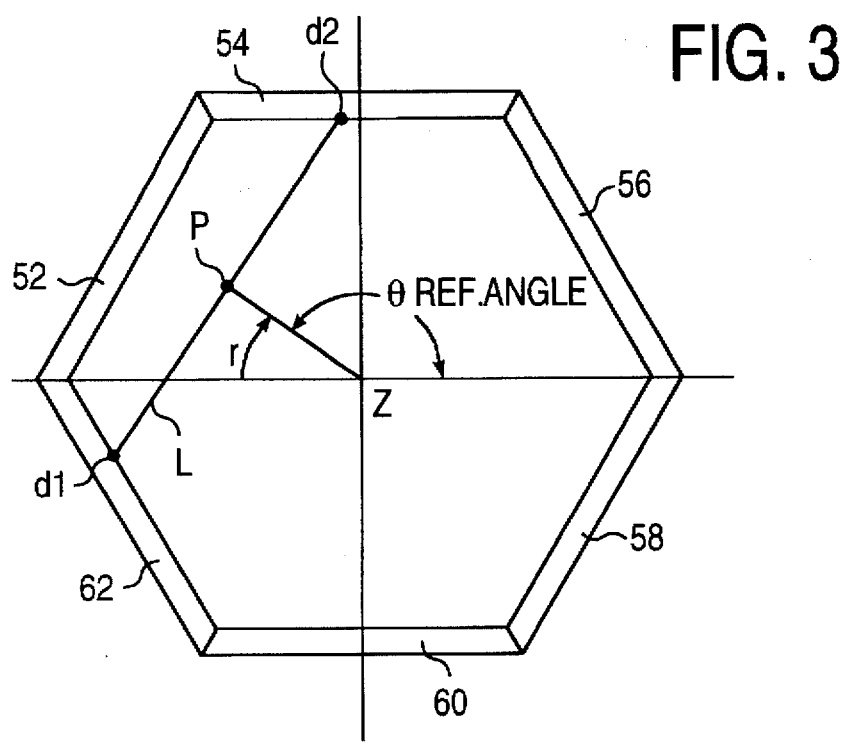
FIG. 3 is a schematic diagram illustrating the transverse geometry of a known technique for reorganizing ("rebinning") raw coincidence data in PET.
Figure 4:
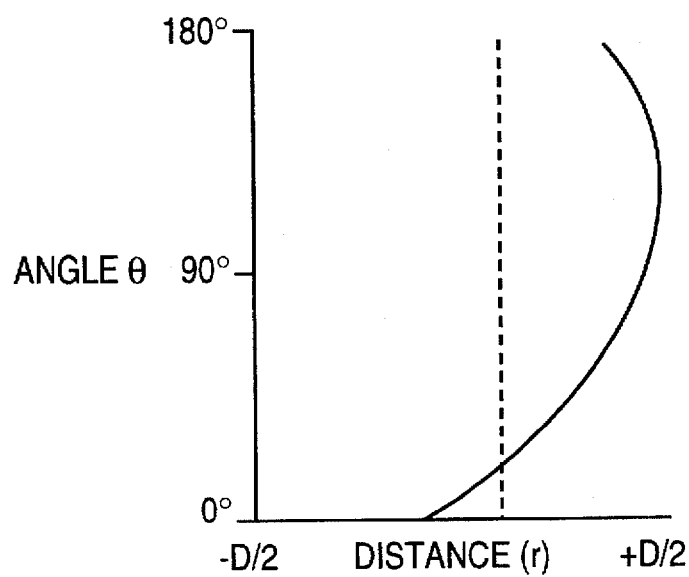
FIG. 4 is an illustration of a sinogram for a point source located as depicted in FIG. 3.

FIGS. 3 and 4 illustrate known techniques for creating sinograms depicting point sources in two-dimensional space. A point source "P" in FIG. 3 is located within the field of view encompassed by the hexagonal array of detectors 52–62. The coincidence line "L", which for the purpose of this illustration lies in a plane perpendicular to the longitudinal axis (z) of the field of view, and therefore within a single "slice" of the volume under study, encounters detectors 54 and 62. Computing from the positions of the end points $d_1, d_2$ of the coincidence line "L" relative to the detectors 62 and 54, a coincidence line through the point source "P" may be determined. The radius "r" of the point P from the center (the z axis) of the field of view may likewise be determined. Also, a reference angle $\theta$ may be determined for P relative to a horizontal or other datum line. Plotting the reference angle $\theta$ relative to the distance from the center (r), as shown in FIG. 4, yields a sinogram as depicted in FIG. 4, a function of r and $\theta$ (the conventional indices for two-dimensional sinograms). Thus, for a reconstructed slice at index I(z) on the longitudinal axis (z) within the field of view of the scanner, there is a corresponding sinogram, which may be denoted "sino $(r,\theta,I(z))$", that may be input to the reconstruction algorithm.

Figure 5:
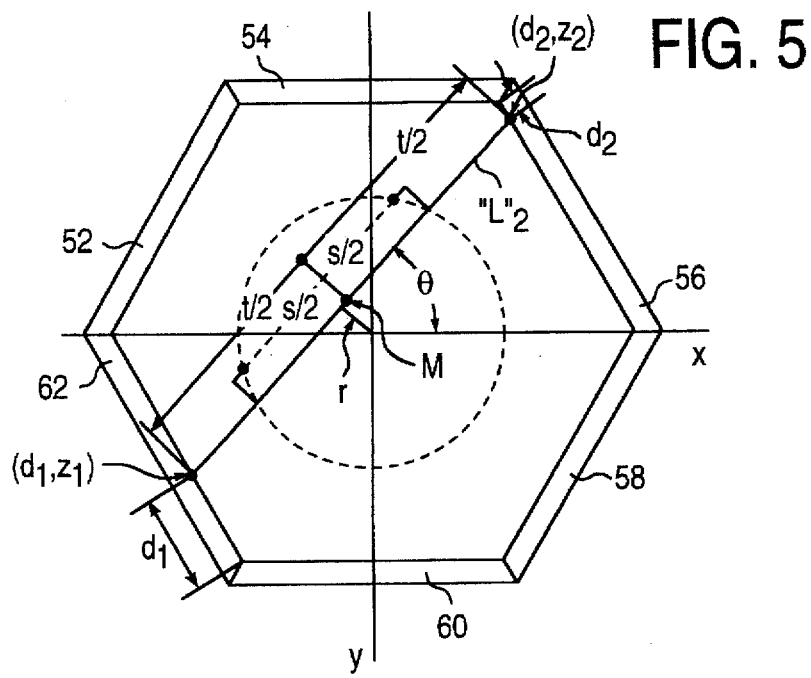
FIG. 5 is a schematic diagram illustrating the transverse geometry of the new technique for reorganizing raw coincidence data in PET.
Figure 6:
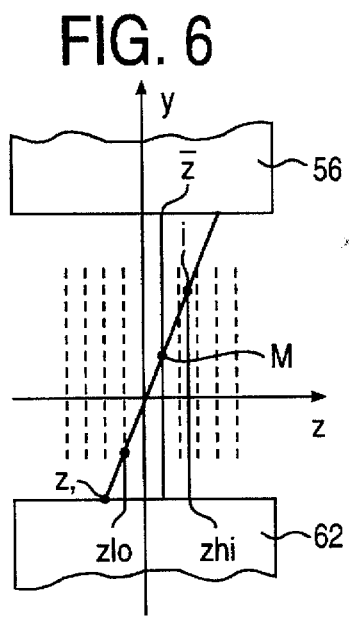
FIG. 6 is a schematic diagram illustrating the axial geometry of the technique shown in FIG. 5.

Referring now to FIGS. 5 and 6, $(d_1,z_1)$ and $(d_2,z_2)$ are the detector coordinates resulting from coincident detection of a collinear pair of gamma rays. The coincidence line "$L_2$" from $(d_1,z_1)$ to $(d_2,z_2)$ is projected onto the transverse $(x,y)$ plane $z=0$, where the parameters $(r,\theta)$ of the projected line and of the point "M" half-way along the projected line are determined. For the half-way point M on the projected line, one can determine the z-coordinate on line L2 that projects to this point. Referring to FIG. 6, this z coordinate is denoted by Z, and it will be seen that $Z=(z_1+z_2)/2$. I(Z) denotes the index of the slice containing Z, and the increment for a location in the sinogram may be denoted by incr. Then for each coincidence line one can determine r, $\theta$ and Z as described above and add incr to sino $(r,\theta,I(z))$.

In the above described steps, the increment is applied to only a single sinogram for each coincidence line. In such a case, which may be referred to as "single slice rebinning", the increment (incr) would be set at 1. In multi-slice rebinning, however, in accordance with the present invention, the following additional steps are taken: instead of considering only the point "M" half-way along the projected line $L_2$, one determines as well the z coordinates at which the coincidence line $L_2$ enters and leaves the volume to be imaged. Referring again to FIG. 6, the z-coordinates on the coincidence line 12 are designated "zlo" and "zhi". The distance across the hexagon between the two detectors, i.e., the length of the line from the detector coordinates ($d_1$,O) to ($d_2$,O), is denoted by t. It will be seen that $$zlo = Z - (s/2)|z_2 - z_1|/t$$

and $$zhi = Z + (s/2)|z_2 - z_1|/t$$

where "s" (seen in FIGS. 5 and 6) is set equal to the diameter of the transverse field of view.

The sinograms sino(r,θ,i) for each slice i between I(zlo) and I(zhi) are incremented. For a given coincidence line, the same increment is given to all slices in this range, but the increment is different for different coincidence lines, depending on the number of sinograms to be incremented. In this regard, the increment is made inversely proportional to the number of sinograms incremented, i.e., $$incr = \frac{maxincr}{I(zhi) - I(zlo) + 1}$$

In the presently preferred embodiment of the invention, sinograms and increments are represented by integers, and the maximum increment is set at 64. After all coincidence lines have been rebinned, a normalization factor is applied so that the total number of counts in the stack of sinograms is equal to the number of events rebinned.

Figure 7:
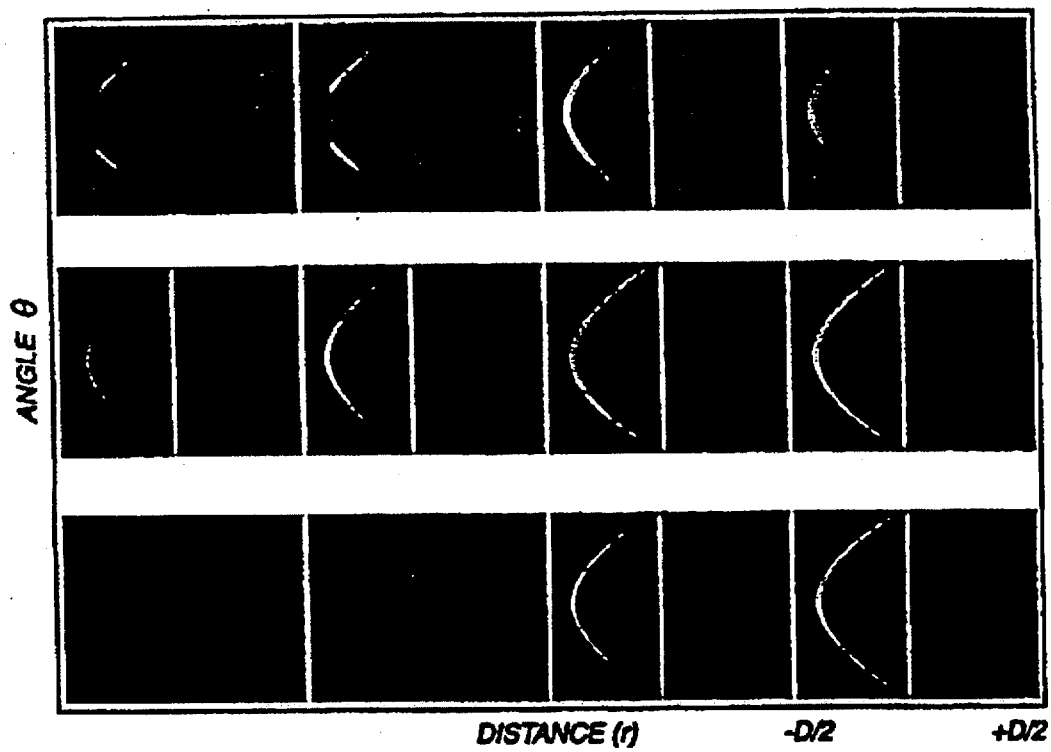
FIG. 7 depicts sinograms demonstrating the properties of various techniques for reorganizing raw data, specifically the known technique involving single-slice rebinning, and the present invention involving multi-slice rebinning.

The properties of the two methods of rebinning, single-slice and multi-slice, are demonstrated in FIG. 7. This figure shows the sinograms resulting from the rebinning of simulated coincidence data (with slice thickness 2 mm) for an activity distribution consisting of two small (6 mm diameter) spherical sources, one centered at (0,0,0) and the other at (100,0,0) mm.

The top row of sinogram frames shows a range of slices in the stack of sinograms resulting from single-slice rebinning, where the slice containing the centers of both sources (i.e., the slice z=0) is at the right-hand end of the row. It is apparent from the sinograms that slice-by-slice reconstruction will produce an accurate image of the source at (0,0,0), but will produce a distorted image of the source at (100,0,0). For the off-center image of the source, the sinograms are non-uniform in angle (the vertical direction in FIG. 7), because the counts for some angles have been assigned to slices that do not contain the source. Reconstruction from non-uniform sinograms such as these will lead to distorted images. For a typical point source, the amount of the blurring in the x, y, and z directions depends strongly on the position of the source.

Referring again to FIG. 7, the middle row of sinogram frames in FIG. 6 shows the corresponding slices resulting from multi-slice rebinning. Compared to single-slice rebinning (the above-discussed top row) the sinograms are much more uniform in angle, but it will be seen that there is strong blurring in the z direction which, as will be explained, may be corrected by axial filtering in accordance with the present invention. The bottom row of sinogram frames in FIG. 7 illustrates the effect of multi-slice rebinning and axial filtering, in accordance with this invention.

Referring again to FIG. 7, it will be noticed that for multi-slice rebinning without filtering, the reconstructed image of a point source is reasonably localized in the x and y directions, but is spread out in the z direction. The image is localized in x and y because the rebinned sinograms for each z are reasonably uniform over the full range of angles θ. The spread in the z direction is largest for a point source in the central slice of the axial field of view because the range of slopes of detected coincidence lines is largest for such a point. The extent of the spread in the z direction decreases steadily as the point is moved in the z direction toward the edge of the axial field of view, until the spread becomes zero at the edge of the axial field of view, where no oblique lines are detected. This relationship is evident in FIG. 8, which graphically depicts spread functions (derived as described below) for seven points on the z axis in an exemplary scanner. The points are distributed from z=0 (axial position 64 in FIG. 8) to z=60 mm (axial position 124 in FIG. 8). Axial position 64 represents the center in the axial (z) direction of the field of view.

That the extent of the blurring in the z direction is strongly dependent on the z coordinates of the point source prevents use of the most efficient deconvolution methods for deblurring in the z direction of sinograms or reconstructed images. The problem can be overcome, however, using more general methods. A more fundamental problem is the dependence of the blurring on x' and y', which arises because a line at a certain r,θ, and slope (where slope=($z_2$−$z_1$)/t) through a point in a plane z=z' far from the z axis does not increment the same set of slices as does a line having the same r,θ and slope through (0,0,z'), i.e., through another point that is in the same plane but is on the z axis. This problem can be overcome by general deblurring methods operating in image space, as described below. It is, however, a fundamental problem for methods that operate in sinogram space because, in the process or rebinning, coincidence lines through many different transverse points (x',y') are accumulated in the same location (r,θ) in the sinogram. For this reason, the process for correction of the sinogram has to assume that the blurring function is the same for the different points (x', y').

As has been noted, rebinning of coincidence data produces, in effect, a stack of sinograms, each of which may be reconstructed independently by a 2D reconstruction algorithm to produce a stack of slice images. In the aggregate, these may be called for convenience a preliminary image. As indicated above, multi-slice rebinning of oblique coincidence lines leads to blurring in the z direction in the sinograms, and consequently in the 3D reconstructed volume.

In accordance with the invention, axial filtering, presently preferred techniques for which will now be described, addresses and eliminates unacceptable blurring in the reconstructed volume.

(a) Image Filtering

The term "object space" and coordinates (x',y',z') may be used to refer to the 3D space containing an unknown activity distribution, denoted by f'. The term "image space" and coordinates (x,y,x) may be used to refer to the 3D space containing the reconstructed estimate of the activity distribution, denoted by f, and the preliminary image, denoted by g. It may be assumed that the detection process is linear, so that there is a linear relationship between the coincidence data and the function f'. Since multi-slice rebinning and slice-by-slice reconstruction are linear operations, the preliminary image g can be expressed in terms of the activity distribution f' by $$g(x,y,z)=\iiint f'(x',y',z')h(x,y,z,x',y',z')dx'dy'dz'$$

where h is the point-response function. More specifically, h(x,y,z,x',y',z') is the reconstructed value at the (x,y,z) in the preliminary image due to an isolated point source at (x',y',z'). The discrete form of the above equation can be expressed as $$g=Hf'$$

where g and f are N×1 vectors and H is an N×N matrix.

In the case of three dimensional blurring, N is the total number of elements in the volume image. However, in the illustrated case of significant blurring only in the z direction, N is the number of slices, and there is a separate system of equations for each point (x,y) in the transverse plane. Since the computational requirements for the filtering operation are much less than the case of 3D blurring, and since, as discussed above, the blurring due to multi-slice rebinning is mostly in the z direction, it is practicable to concentrate on the case of blurring only in the z direction.

Each element h of the matrix H can be found for a particular scanner geometry by simulating the multi-slice rebinning procedure for a point source at the corresponding position on a grid in object space. It will be apparent that since g and H are known, there is a system of linear equations for each column of the image volume (each x and y) from which we want to obtain f (an estimate of the activity distribution f') whose elements correspond to the N slices in the column.

Methods for solving the systems of linear equations that arise in the formulation of deblurring problems are discussed in many books (e.g., P. A. Jansson, Deconvolution with Applications in Spectroscopy. Orlando, Fla.: Academic Pres, 1984; S. Twomey, Introduction to the Mathematics of Inversion in Remote Sensing and Indirect Measurements. Amsterdam: Elsevier, 1977) and survey papers (e.g., B. R. Frieden, "Image Enhancement and Restoration," Chapter 5 in. Picture Processing and Digital Filtering, T. S. Huang, Ed. Berlin: Springer-Verlag, 1979, pp. 177–248). The classical linear methods for these problems produce a solution vector f which is a compromise between satisfying the equations and satisfying some smoothness conditions. These linear methods have the advantage that the relevant matrix inverse may be precomputed and stored, and then used as a filter for different sets of data. Non-linear methods for deblurring are iterative in nature, and generally require more computation than linear methods, but they have the advantage that positivity constraints may be imposed on the elements of the solution vector f.

In the practice of this invention, it is preferred that an iterative deblurring procedure which is known as Gold's ratio method, P. A. Jansson, supra, or Chahine's relaxation method, W. P. Chu, "convergence of Chahine's Nonlinear Relaxation Inversion method Used for Limb Viewing Remote Sensing," Appl. Opt., vol. 24, pp. 445–447, be used. The estimate of resulting from the kth iteration of this procedure is denoted by $f^{(k)}$, and the procedure is initialized by setting $f^{(0)}=g$. The (k+1)'th iteration of the algorithm (k≧0) is given by $$f_i^{(k+1)} = f_i^{(k)} \left[ \frac{g_i}{(Hf^{(k)})_i} \right], i=1,\ldots,N$$

In practice, the algorithm may be run for only a few iterations, stopping well short of numerical convergence. By changing the number of iterations, different compromises between deblurring of the preliminary image and amplification of the noise can be achieved.

Since no elements of the system matrix H are negative, the multiplicative nature of the correction ensures that no elements $f^{(k+1)}$ can be negative, if the elements of the data vector g are also nonnegative. In order obtain this desirable property, one can use as the vector g the preliminary image with any negative values set to zero.

(b) Sinogram Filtering

It has been explained that a point source at (x',y',z') gives a blurring in the z direction of the stack of sinograms that depends strongly on z' and only weakly on x' and y'. If it is assumed that the point-spread function depends only on z', and not on x' and y', then the preliminary image may be expressed in terms of the activity distribution as $$g(x,y,z)=\int f'(x,y,z')h^3(z,z')dz'$$

where $h^3(z,z')$ is the reconstructed value at (x,y,z) in the preliminary image due to a point source at (x,y,z'). The image-space blurring represented by the above equation can be expressed by an equivalent blurring in the stack of sinograms, with coordinates (r,θ,z). One can convert from image space to sinogram space by taking projections (slice-by-slice) of both sides of the above equation. The sinogram-space result is $$z(r,\theta,z)=\int p'(r,\theta,z')h^3(z,z')dz$$

It will be noted that p', p and q are analogous to f', f, and g in the previously described case of image filtering. Discretizing the above equation for the case of N slices yields $$q=H^3 p'$$

where q and p' are N×1 vectors (for each r and θ) and $H^3$ is an N×N matrix. The elements $h^3$ of the matrix $H^3$ can be found for a specific scanner geometry by simulating the multi-slice rebinning procedure for a point source at N different z-positions. Since q and $H^3$ are known, we now have a system of linear equations for each r and θ from which we can estimate the unknown p'(r,θ,z) for each slice.

One can obtain an estimate of p' using the same iterative method described above for image filtering, that is $$p^{(k+1)} = p^{(k)} \left[ \frac{q}{(H^3 p^{(k)})} \right]$$

where, as before, the equation should be interpreted as producing the i'th component of $p^{(k+1)}$ from the i'th components of the vectors p(k), q, and ($H^3 p_{(k)}$), and the procedure is initialized by setting p(0)=q. Since no elements of the data vector q or the system matrix $H^3$ are negative, the multiplicative nature of the correction ensures that no elements of $p^{(k+1)}$ can be negative. The technique therefore has the desirable property that it automatically generates solutions that are physically meaningful, with no negative counts in the deblurred sinograms.

Specific implementations of axial filtering using sinogram filtering and image filtering will now be described. The numerical values quoted in the description are for the geometry of the UGM PENN-PET scanner (6 detectors, 865 mm effective detector separation, 128 mm effective axial field of view) with typical choices for the rebinning and reconstruction parameters (e.g. 2 mm slice thickness, 6.5 degrees axial acceptance angle, 256 mm diameter reconstruction field of view, 2 mm pixel size).

For sinogram filtering, we generate $h^3(z,z')$ for 33 values of z' spaced 2 mm apart (i.e. the slice thickness) from z'=0 (central transverse slice of scanner to z'=64 mm (slice at end of axial field of view). The number of samples of z depends on the acceptance angle and on the position z' in the axial field of view. For an acceptance angle of 6.5 degrees, the total width of the spread function is 15 slices at z'=0, decreasing to zero width at z'=64 mm. The values of the spread function for each z' are generated by multi-slice rebinning of simulated data, as follows.

A simulated point source is placed at (0,0,z') and 10,000 lines through the point source and in the y-z plane are simulated. The lines are uniformly distributed in the angular range specified (i.e. defined) by the acceptance angle (e.g. ±6.5 degrees around the plane z=z'). Each simulated line that intersects a pair of detectors is rebinned, and the accumulated total for each slice in sinogram space is stored in memory as the spread function for this value of z'. The simulated point is then moved along the z axis through a distance equal to the slice thickness, and the multi-slice rebinning process is repeated to generate the next spread function.

After a table of spread functions has been computed, the sinogram filtering is done using the iterative method described above. For each transverse location (r,θ) in the stack of sinograms there is an axial column of length N (number of slices). The sinogram values in this axial column are selected as the elements of the vector q, and the iterative method to estimate p' is initialized by setting $p^{(0)}$=q. After K iterations (typically from 2 to 5), the vector p(k) is stored in the axial column for this (r,θ), and the process is repeated for the next (r,θ) column in the stack of sinograms.

In the case of image filtering, we generate $h^i(x,y,z,z')$ for the 33 values of z' spaced 2 mm apart (i.e. the slice thickness) from z'=0 (central transverse slice of scanner) to z'=64 mm (slice at end of axial field of view). For each value of z' we generate $h^i(x,y,z,z')$ for 49 samples of x and y on a 7×7 grid with a space of 20 mm, so that the grid extends from 0 to 120 mm in the x and y directions. The sample spacing in the x and y directions i larger than that in the z' directions, because the rate of variation of the function hi is much greater in the z' direction than in the x and y directions. The number of samples of z depends on the acceptance angle and on the position (x, y, z'). The value of the spread function for each position are generated by multi-slice rebinning of simulated data, as follows.

A simulated point source is placed at (x,y,z') and lines through the point source are simulated. The lines are uniformly distributed in the angular range specified by the acceptance angle (e.g. ±6.5 degrees around the plane z=z') and in the angular range 0 to 180 degrees for the projection of the line onto the transverse plane. Each simulated line that intersects a pair of detectors is rebinned, and the accumulated total for each slice in sinogram space is stored as the spread function for this (x,y,z'). The simulated point is then moved to the next grid point, and the multi-slice rebinning process is repeated to generate the next spread function. We presently simulate lines for 192×256 angles (transverse× axial) for each of the 7×7×33=1617 positions of the point source. These positions at which the spread function is computed are distributed over the image-space octant for which x≧0, y≧0, z≧0. When the blurring function $h^i$ is needed for some arbitrary (x,y,z), the precomputed spread function at the position nearest to (|x|,|y|,|z|) is used.

Figure 8:
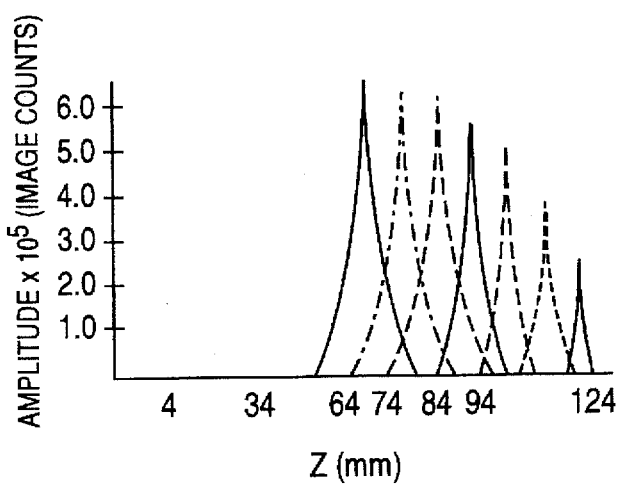
FIG. 8 graphically depicts spread functions in the axial (z) direction, derived in accordance with the invention.

Examples of the point-spread function $h^i$ are shown in FIG. 8 for points on the z' axis. FIG. 8 shows clearly the decreasing height and width of the axial spread function, due to the decreasing axial acceptance angle, as the simulated point source is moved along the z' axis. The filtering process adjusts the data for the relative height of the $h^i$ functions, so the standard axial normalization is performed automatically, together with the axial deblurring. As has been explained, it has been found that the spread function is nearly constant in the transverse direction, but changes rapidly in the z direction.

The above-described method of image filtering is applied independently to each axial column of the image volume in a manner similar to the implementation of sinogram filtering that is described above. Image filtering as described above may be viewed as more general than sinogram filtering, since sinogram filtering is based on the assumption that the spread function for a point source at (x',y',z') is independent of x' and y'. On the other hand, this assumption means that only a few different spread functions are needed for sinogram filtering, so relatively little computation is required to produce the table of spread functions. Once the tables of spread functions have been produced for the respective methods, implementation of sinogram filtering takes approximately four times as long as image filtering because of the relative sizes of the arrays involved. With the above geometry, the sinogram array for each slice is 192 angles× 256 rays, whereas the reconstructed image for each slice is a circular region of diameter 128 pixels. An image filtering operation of 5 iterations on a volume image of 63 slices may be performed in less than 3 minutes with a non-optimized program on a Sun Microsystems SparcStation 330 (using a precomputed table of spread functions).

Figure 9:
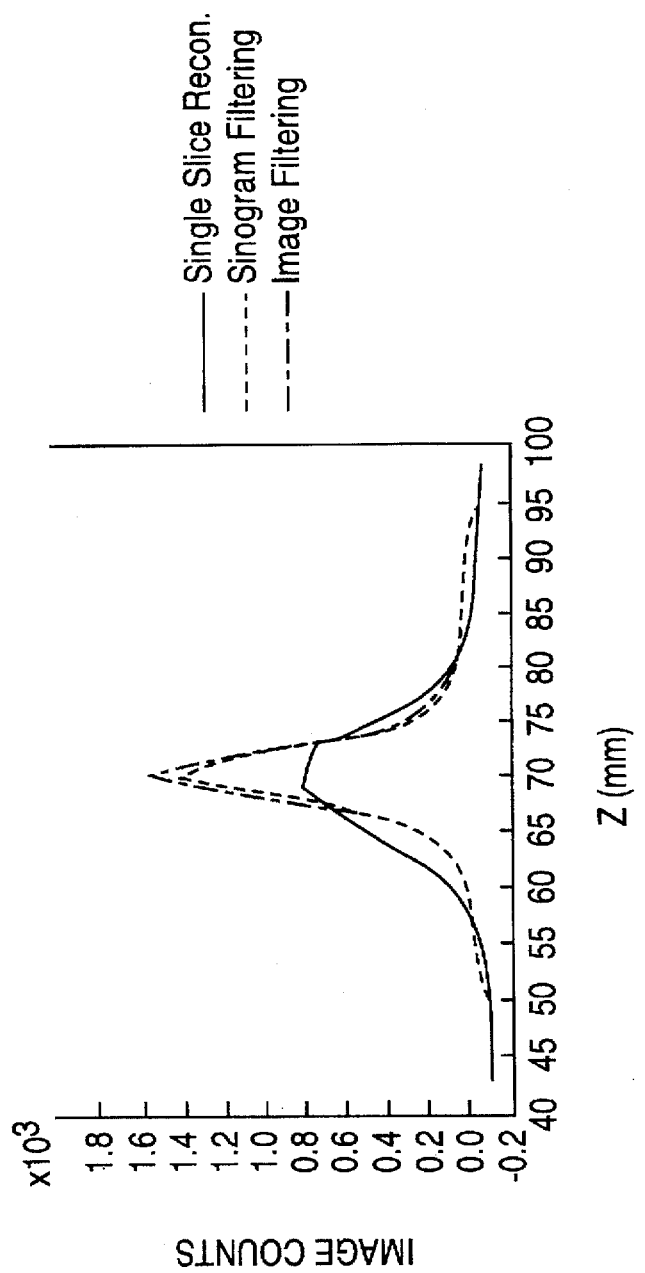
FIG. 9 graphically depicts data for the axial (z) profile through a point source, using the present invention and other image reconstruction techniques.

FIG. 9 shows profiles through a point source using single-slice reconstructions showing a low amplitude but wide profile and the same data reconstructed using both sinogram and image axial filtering. The latter two profiles show higher amplitude and a narrower profile demonstrating the improved performance achieved with multi-slice rebinning followed by axial filtering.

The operation of multi-slice rebinning can be performed in real time during data collection, thereby reducing memory and computational requirements relative to previously described methods.

In PET imaging, coincidence data is normally collected over a 180-degree range of projections about the z axis. The present invention has thus far been described with the assumption that data is collected for all projection angles about the z axis (i.e., for a full 180-degree range). However, because of time and cost constraints, it may be impractical to collect data from all projection angles. As will now be described, the present invention includes a method of performing multi-slice rebinning and axial filtering using only a limited number of projections in order to reduce the overall time required for collecting and reconstructing data. However, it should be appreciated that the use of a limited number of projections according to the present invention is not necessarily limited to use with multi-slice rebinning.

It should also be appreciated that the use of a limited range of projections results in acquisition of an incomplete set of data. The filtered backprojection (FBP) reconstruction technique is based on the assumption that a complete set of data is available and is therefore unsuitable for this purpose. However, by using an iterative reconstruction algorithm, the range of projection angles used may be substantially reduced.

Figure 10:
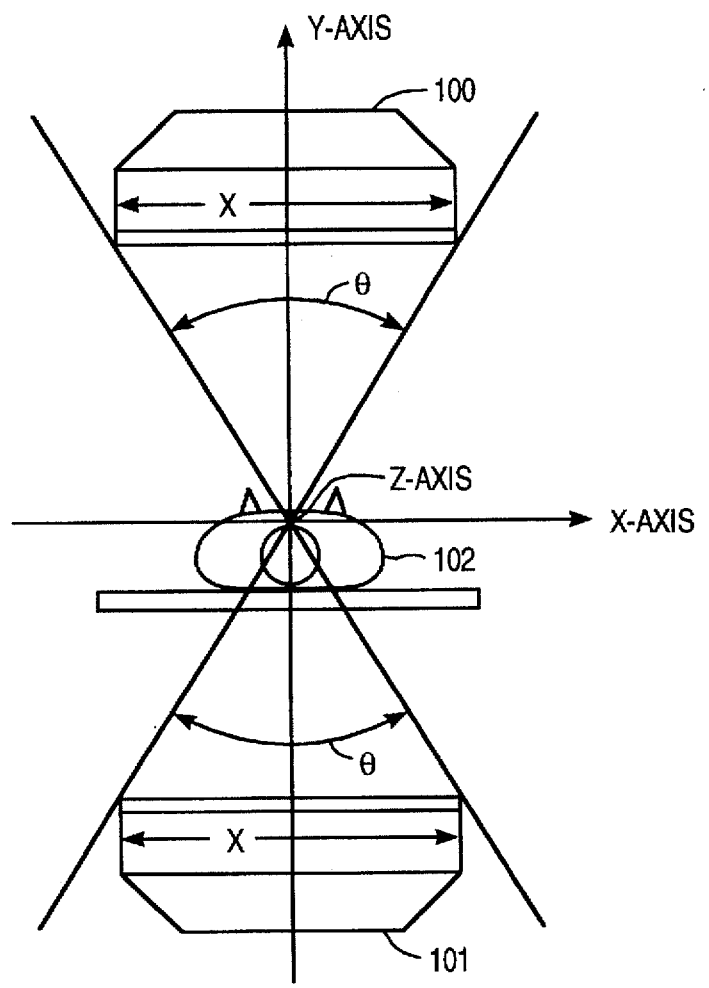
FIG. 10 illustrates an arrangement for performing PET imaging using limited projections.

FIG. 10 illustrates an arrangement having two detectors 100 and 101 for collecting data over a range θ of projection angles that is less than 180 degrees. Note that a hexagonal array of detectors, such as that depicted in FIGS. 1, 3, and 5, generally would not be used when using a limited range of projection angles. Although such a limited range yields in an incomplete set of data in the transverse (x-y) planes, the set of data collected in the coronal (x-z) planes is relatively complete. Consequently, an iterative reconstruction algorithm can be used to compensate for the lack of a full set of data, and such algorithm needs only to perform iterations in two dimensions, i.e., in the transverse planes. The projection angles can be limited to a range as small as the angle θ subtended by the two detectors 100 and 101 when the detectors are stationary, as shown in FIG. 10 which is typically 20 to 30 degrees. Alternatively, the detectors 100 and 101 may be rotated by some amount less than 180 degrees for each position along the z axis to obtain a somewhat larger range of projection angles; the result is a compromise between time/cost savings achieved by having stationary detectors and the completeness of data achieved by using a full range of projections.

Figure 11:
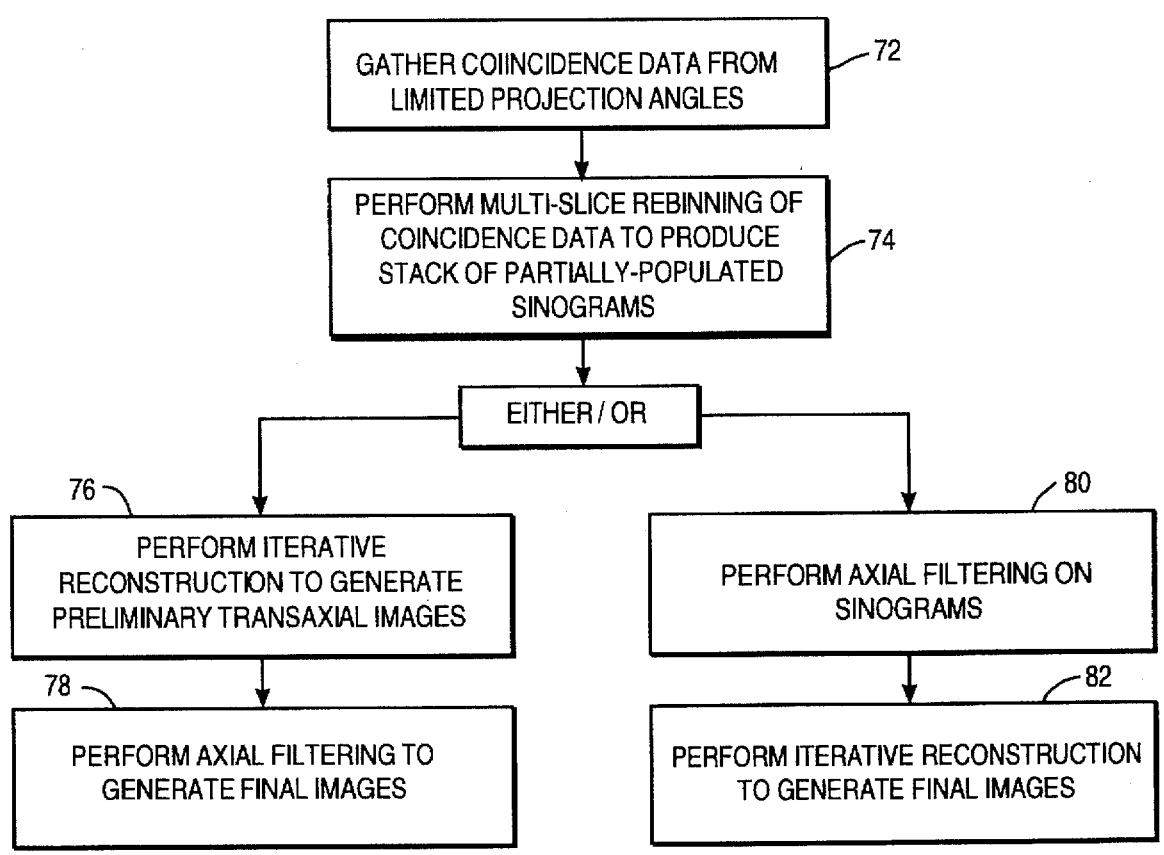
FIG. 11 is a flowchart describing a method of performing multi-slice rebinning and axial filtering using limited projections.

Referring now to FIG. 11, the method of reconstructing images by combining multi-slice rebinning, iterative reconstruction, and axial filtering is illustrated. At step 72, coincidence data is first gathered using a limited range of projection angles for each position along the z axis. Next, at step 74 multi-slice rebinning is performed as described above, resulting in the generation of a stack of partially populated sinograms. The sinograms are only partially populated as a result of the limited range of projection angles. At step 76 a two-dimensional iterative reconstruction algorithm is employed to reconstruct a set of preliminary transaxial images, followed by axial image filtering at step 78; alternatively, axial filtering may be performed as described above directly upon the stack of partially-populated sinograms at step 80, followed by reconstruction of final images using the two-dimensional iterative algorithm st step 82.

Figure 12:
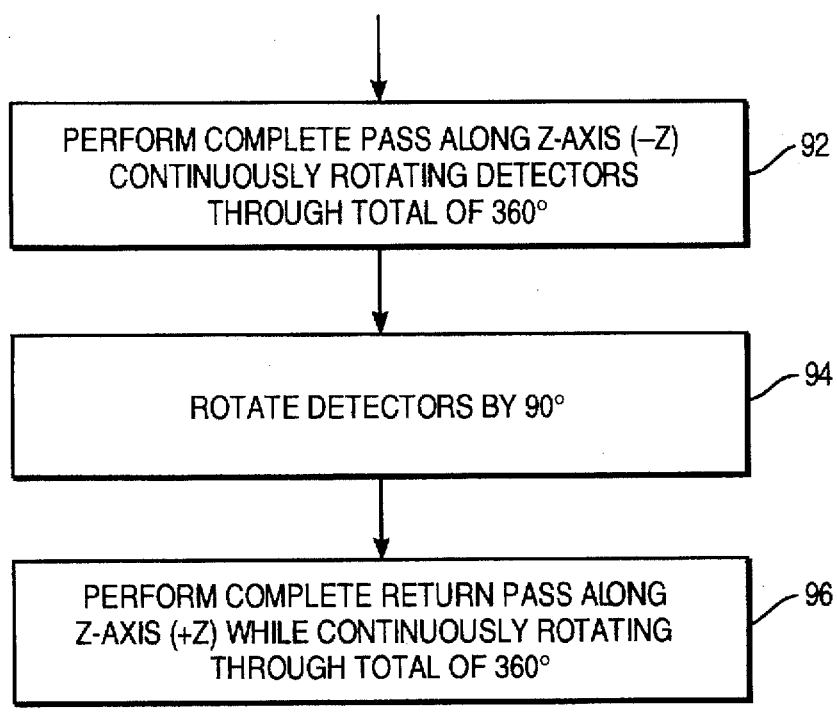
FIG. 12 is a flowchart describing a method of collecting data from limited projections using a spiral scan.
Figure 13A:
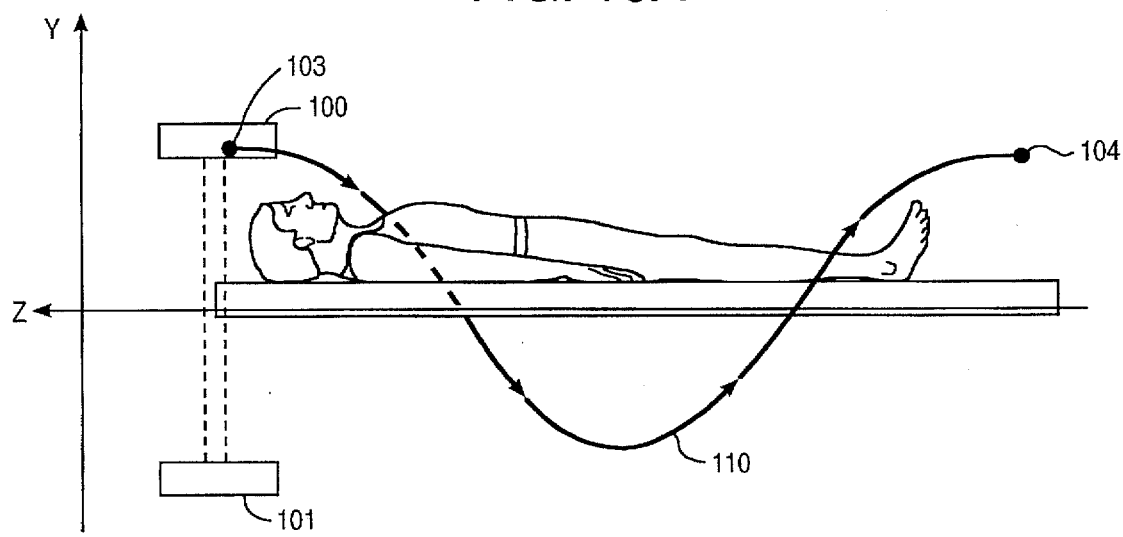
FIG. 13A illustrates a technique for data collection in PET imaging including a spiral scan.
Figure 13B:
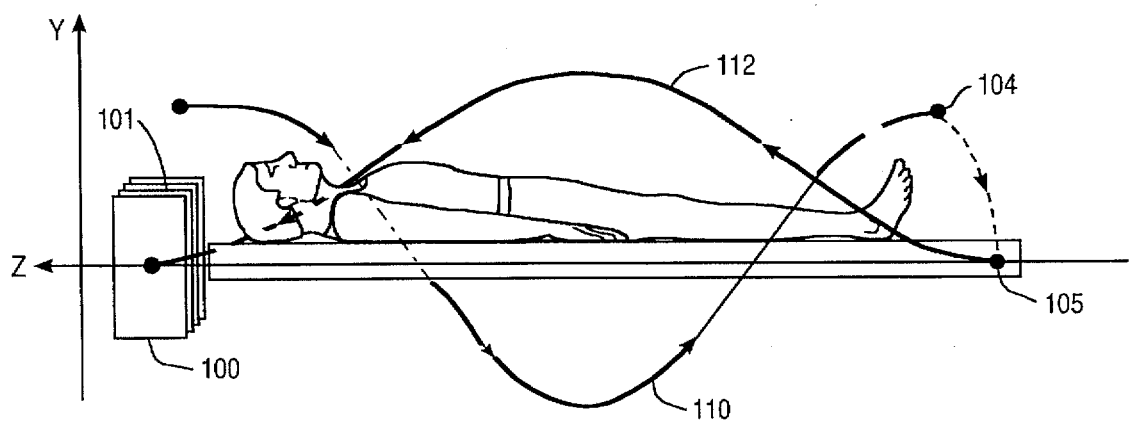
FIG. 13B illustrates a technique for collecting orthogonal sets of data in PET imaging using a spiral scan.

FIGS. 12, 13A, and 13B illustrate alternative approaches to performing PET imaging using limited projections. A common technique for collecting coincidence data is to gather the data on a slice-by-slice basis; that is, data is collected for a range of projection angles for one position at a time along the z axis. This technique involves moving the patient or the detectors in discrete movements along the z axis each time a full range of projections is completed for a given z position. Such discrete movements can be uncomfortable for some patients. Consequently, the present invention provides for the use of a spiral (helical) scan to gather coincidence data in order to reduce patient discomfort while also making use of limited projections. The spiral scan may be combined with the multi-slice rebinning and axial filtering techniques described above.

Referring to FIGS. 12 and 13A, the detectors 100 and 101 are first positioned 180 degrees apart for coincidence detection, such that detector 100 is in a starting position 103. At step 92, a first scan pass is performed. In the first scan pass, coincidence data is collected while rotating the detectors 100 and 101 about the z axis and while providing relative translation between the patient and the detectors along the z axis (e.g., by moving the patient, the detectors, or both). The result is that the detectors take a spiral path 110 relative to the patient. In the currently preferred embodiment, the detectors are rotated through one 360 degree revolution about the z axis, such that detector 100 comes to rest in position 104. An iterative algorithm may be used to compensate for the lack of a complete set of data. Note also that a motion compensation algorithm may be required in conjunction with the spiral scan techniques described herein.

Although in the currently preferred embodiment the detectors are rotated exactly once around the z axis (for a total of 360 degrees), it should be appreciated that the present invention does not require that exactly one full rotation be used. More than one full rotation or less than one full rotation may be used. For example, it may be desirable to rotate the detectors through only 180 degrees.

In another embodiment using a spiral scan, which is illustrated in FIG. 13B, a second scan pass is performed to provide a more complete set of data. In the embodiment of FIG. 13B, the detectors are rotated 90 degrees (step 94) following the first scan pass, such that detector 100 is placed in resting position 105. A second spiral scan is then performed (step 96) along the z axis in a direction opposite that of the first scan pass. Preferably, the detectors 100 and 101 are again rotated through one 360 degree rotation, although other ranges of rotation may be used. Hence, the first scan pass and the second scan pass together yield two orthogonal sets of data. This approach consumes more time than the approach of FIG. 13A but provides greater accuracy because of the additional data collected.

Various iterative reconstruction algorithms are known in the art for performing image reconstruction in three dimensions. Such algorithms may be adapted, if necessary, to perform iterations in only two-dimensions for specific embodiments of the present invention. Iterative reconstruction algorithms include image space methods, such as the image space reconstruction algorithm (ISRA) described by M. Daube-Witherspoon and G. Muehllehner in "An Iterative Image Space Reconstruction Algorithm Suitable for Volume ECT", IEEE Transactions on Medical Imaging, vol. MI-5, No. 2, June 1986. In addition, iterative reconstruction algorithms include projection space methods, such as the Maximum Likelihood Estimation (MLE) technique described by L. Shepp and Y. Vardi in "Maximum Likelihood Reconstruction for Emission Tomography", IEEE Transactions on Medical Imaging, vol. MI-1, No. 2, October 1986. It should be appreciated that either an image space algorithm or a projection space algorithm may be used according to the present invention.

Figure 14:
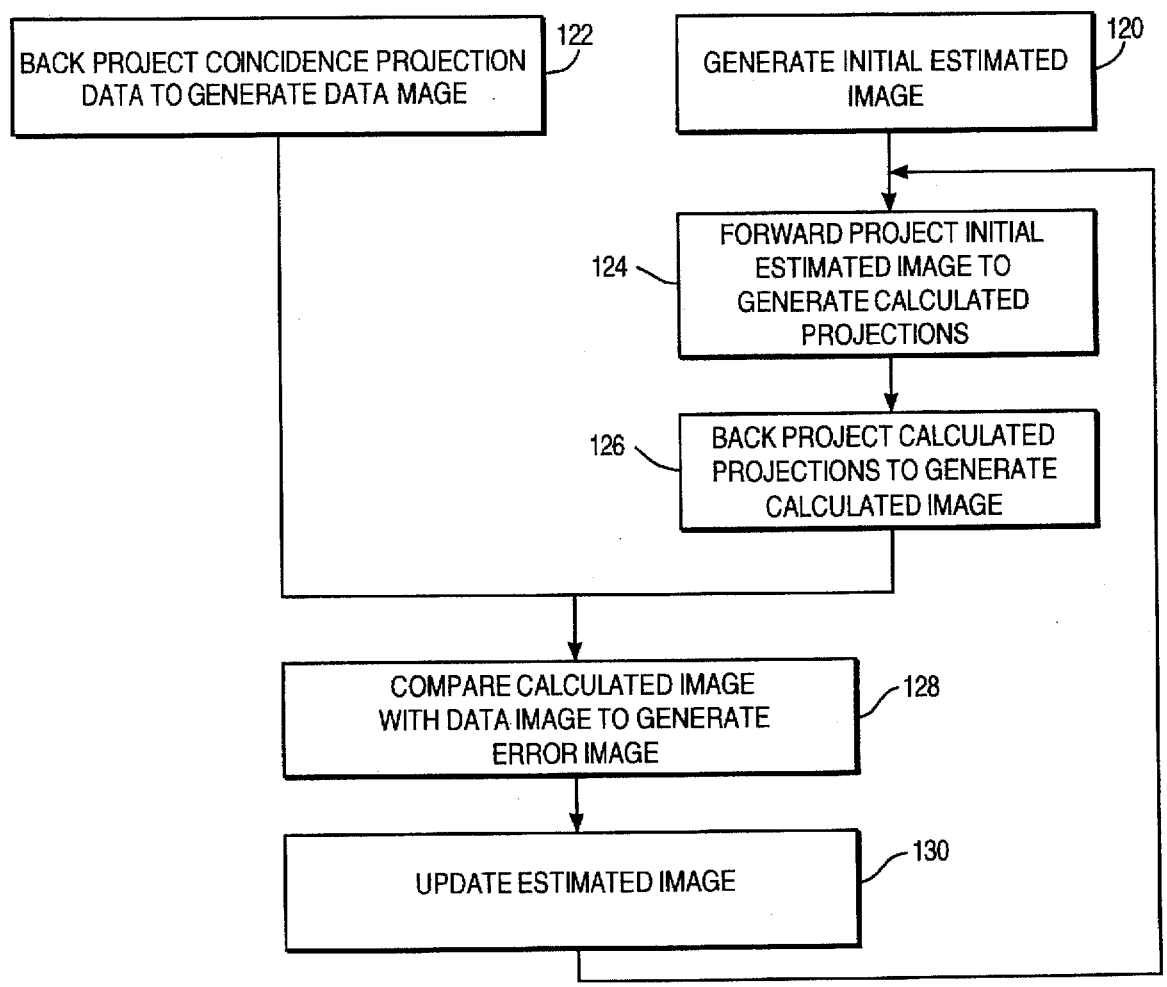
FIG. 14 is a flowchart illustrating an iterative image space reconstruction method.

FIG. 14 illustrates the ISRA algorithm as an example of an iterative image space technique. At 120 an initial estimated image is generated. At 122, coincidence data is backprojected, resulting in the generation of a data image. At 124, the initial estimated image is forward-projected to produce a set of calculated projections. These calculated projections are then backprojected at 126 to generate a calculated image. At step 128, the data image and the calculated image are compared to generate an error image. At 130, the estimated image is updated based upon the error image, and the updated estimated image, and the process is repeated from step 124 using the updated estimated image.

Figure 15:
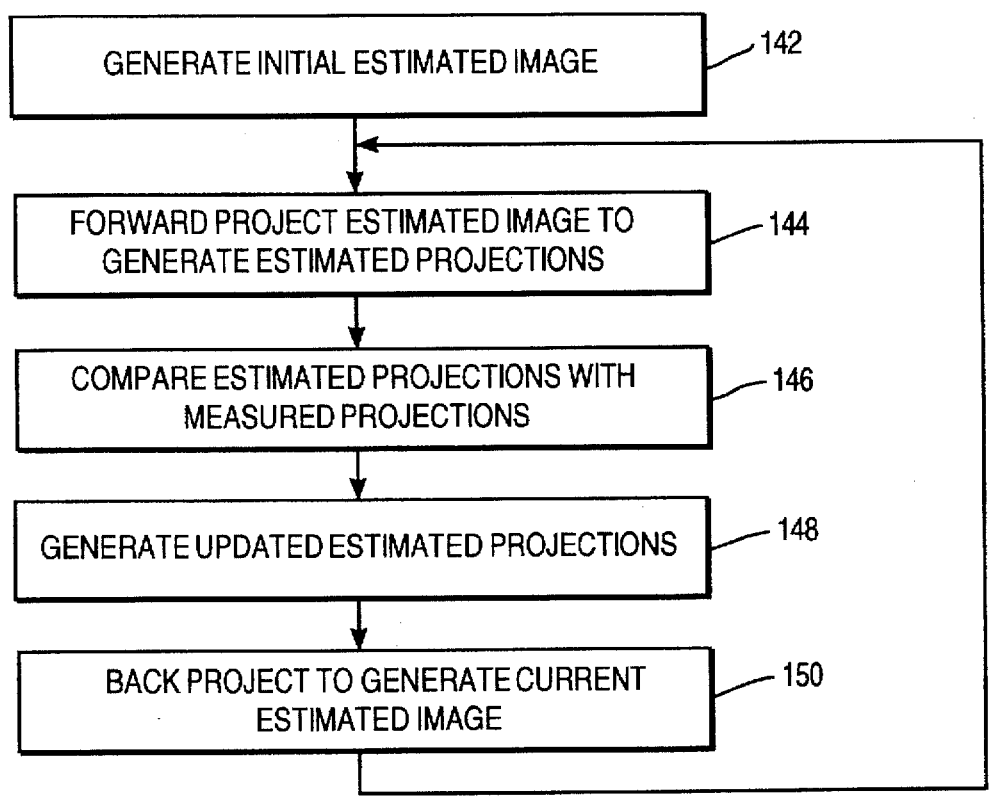
FIG. 15 is a flowchart illustrating an iterative projection space reconstruction method.

FIG. 15 illustrates the ML algorithm as an example of an iterative projection space technique. At 142, an initial estimated image is generated. This estimated image is then forward projected at 144 to generate a set of estimated projections. At 146, the estimated projections are compared with actual measured projections, and the estimated projections are updated accordingly at 148. The updated estimated projections are then backprojected at 150 to generate an updated estimated image. The process then repeats from step 144 using the updated estimated image.

Hence, what has been described is a method and apparatus for image generation from limited projections for PET using multi-slice rebinning. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of reconstructing an image in a medical imaging system, the medical imaging system including a plurality of detectors capable of detecting a plurality of rays occurring within a range of projection angles, the rays including transverse rays and oblique rays, the method comprising the steps of:

detecting the plurality of rays using the detectors;

generating a collection of data representative of the detected rays;

rebinning the data to create a stack of two-dimensional data sets corresponding to individual transverse slice images, wherein the slice images signify in the aggregate a three-dimensional image, wherein for each data set, the data included in said data set corresponds to less than all possible projection angles for the corresponding slice image;

applying a two-dimensional iterative reconstruction algorithm to each of the data sets to reconstruct a three-dimensional image slice-by-slice from the data sets; and axially filtering the rebinned data.

2. A method according to claim 1, wherein the step of rebinning the data comprises the steps of:

for each oblique ray, identifying among said data sets the images intersected by said ray; and applying to each of the data sets associated with the images intersected by the ray an increment representative of the ray.

3. A method according to claim 2, each of the data sets includes data corresponding to a utilized range of projection angles of substantially less than 180°.

4. A method according to claim 3, wherein during the step of detecting the rays, the detectors are not rotated about a z axis.

5. A method according to claim 2, wherein each of the detectors has a transverse dimension, and wherein the range of projection angles is limited to the angle subtended by the transverse dimension of one of the detectors while said one of the detectors is held stationary.

6. A method according to claim 2, wherein the data sets are sinograms, each of the sinograms corresponding to one transverse slice of the three-dimensional image.

7. A method according to claim 2, wherein the detectors are rotatable about a z axis, wherein the step of detecting the rays comprises the step of performing a first scan pass characterized by a helical path of relative motion between the detectors and an object to be imaged.

8. A method according to claim 7, wherein during the step of performing the first scan pass, each of the detectors is rotated by a total of approximately an integer multiple of 180 degrees around the z axis for the first scan pass.

9. A method according to claim 8, further comprising the step of, following completion of the first scan pass, rotating the detector approximately 90° relative to the object to a starting position.

10. A method according to claim 9, wherein the step of detecting the rays further comprises the step of performing a second scan pass from the starting position, wherein the second scan pass is characterized by a helical path of relative motion between the detectors and the object, wherein the first scan pass and the second scan pass in aggregate result in the acquisition of sets of orthogonal data.

11. A method according to claim 3, wherein the iterative reconstruction algorithm is used to perform image-space reconstruction.

12. A method according to claim 3, wherein the iterative reconstruction algorithm is used to perform projection-space reconstruction.

13. A method according to claim 3, wherein the iterative reconstruction algorithm is a maximum-likelihood estimation (MLE) algorithm.

14. A method of reconstructing an image using a medical imaging system, the medical imaging system including a plurality of detectors capable of detecting a plurality of rays, the rays including transverse rays lying within a plurality of transverse planes and oblique rays not lying within the transverse planes, the detectors being rotatable about a z axis, the method comprising the steps of:

performing a first scan pass along the z axis using to detectors to detect the rays over a range of projection angles, wherein the first scan pass is characterized by a helical path of relative motion between the detectors and an object to be imaged wherein the range of projection angles used is substantially less than 180 degrees for each of the transverse planes;

converting the detected rays to a collection of data representative of the detected rays;

rebinning the data to create a stack of two-dimensional data sets corresponding to individual transverse slice images, wherein the slice images signify in the aggregate a three-dimensional image, wherein the step of rebinning the data comprises the steps of:

for each oblique ray, identifying among said data sets the images intersected by said ray; and applying to each of the data sets associated with the images intersected by the ray an increment representative of the ray;

applying an iterative reconstruction algorithm to each of the data sets to reconstruct a three-dimensional image slice-by-slice from the data sets; and axially filtering the rebinned data.

15. A method according to claim 14, wherein the iterative reconstruction algorithm is two-dimensionally iterative.

16. A method according to claim 14, wherein the iterative reconstruction algorithm is used to perform image-space reconstruction.

17. A method according to claim 14, wherein the iterative reconstruction algorithm is used to perform projection-space reconstruction.

18. A method according to claim 17, wherein the iterative reconstruction algorithm is a maximum-likelihood estimation (MLE) algorithm.

19. A method according to claim 14, wherein the data sets are sinograms, each of the sinograms corresponding to one transverse slice of the three-dimensional image.

20. An apparatus for reconstructing an image in a medical imaging system, comprising:

means for detecting both transverse and oblique rays emitted within a range of projection angles, the means for detecting including a plurality of detectors, the transverse rays lying within a plurality of transverse planes perpendicular to a z axis, the oblique rays not lying within the transverse planes, the projection angles defined within the transverse planes, wherein the range of projection angles is less than 180 degrees;

means for converting the detected rays to data;

means for collecting and assembling the data representative of the detected rays;

means for rebinning the data to create a stack of two-dimensional data sets representative of individual transverse slice images, such that the slice images signify in the aggregate a three-dimensional image, the means for rebinning the data including:

means for, for each oblique ray, identifying among said data sets the images intersected by said ray; and means for applying to each of the data sets associated with the images intersected by the ray an increment representative of the ray;

means for applying a two-dimensional iterative reconstruction algorithm to each data set to reconstruct a three-dimensional image slice-by-slice from the data sets; and means for axially filtering the rebinned data.

21. An apparatus according to claim 20, wherein the means for detecting comprises means for detecting rays using a range of projection angles less than 90 degrees for each data set.

22. An apparatus according to claim 20, wherein each of the detectors has a transverse dimension, and wherein the means for detecting comprises means for performing a first scan pass of an object to be imaged, such that the range of projection angles used is limited to the angle around the z axis in the transverse plane which is subtended by the transverse dimension of one of the detectors.

23. An apparatus according to claim 20, wherein the iterative reconstruction algorithm is used to perform reconstruction in image space.

24. An apparatus according to claim 20, wherein the iterative reconstruction algorithm is used to perform reconstruction in projection space.

25. An apparatus according to claim 20, wherein the data sets are sinograms, each of the sinograms corresponding to one transverse slice of the three-dimensional image.

26. An apparatus according to claim 25, wherein the means for detecting further comprises means for detecting the rays using a first scan pass characterized by a helical path of relative motion between the detectors and an object to be imaged.

27. An apparatus according to claim 26, further comprising means for rotating the detectors by a total of approximately an integer multiple of 180 degrees around the z axis during the first scan pass.

28. An apparatus according to claim 27, further comprising:

means for rotating the detectors from a first resting position approximately 90° to a second resting position following completion of the first scan pass; and wherein the means for detecting further comprises means for detecting rays using a second scan pass opposite in direction from the first scan pass and characterized by a helical path of relative motion between the detectors and the object to acquire sets of orthogonal data.

29. In a medical imaging system having a detector for detecting radiation emitted from an object, the detector being rotatable relative to the object about an axis of rotation, a method of performing emission computed tomography, the method comprising the steps of:

detecting radiation emitted from the object using a first scan pass characterized by a helical path of relative motion between the detector and the object;

following completion of the first scan pass, rotating the detector approximately 90° relative to the object to a starting position; and detecting radiation emitted from the object using a second scan pass starting from the starting position, wherein the second scan pass is opposite in direction from the first scan pass and is characterized by a helical path of relative motion between the detector and the object, such that the first scan pass and the second scan pass together result in the acquisition of orthogonal sets of data.

30. An apparatus for performing computed tomography imaging of an object, the apparatus comprising:

a radiation detector that is rotatable relative to the object about an axis of rotation;

means for controlling the radiation detector to detect radiation using a first scan pass characterized by a helical path of relative motion between the detector and the object;

means for rotating the detector, following completion of the first scan pass, approximately 90° relative to the object to a starting position; and means for controlling the detector to detect radiation using a second scan pass, the second scan pass starting from the starting position, wherein the second scan pass is opposite in direction from the first scan pass and is characterized by a helical path of relative motion between the detector and the object, such that the first scan pass and the second scan pass result in the acquisition of orthogonal sets of data.

\* \* \* \* \*

UNITED STATES PATENT AND TRADEMARK OFFICE
CERTIFICATE OF CORRECTION

PATENT NO. : 5,744,802
DATED : April 28, 1998
INVENTOR(S) : Muehllehner et al.

It is certified that error appears in the above-identified patent and that said Letters Patent is hereby corrected as shown below:

In column 4 at line 63 after "by", delete "Z" and insert --$\overline{Z}$--
In column 4 at line 63 after "that", delete "Z" and insert --$\overline{Z}$--
In column 4 at line 63 delete "I(Z)" and insert --I($\overline{Z}$)--
In column 4 at line 64 delete "Z" and insert --$\overline{Z}$--
In column 4 at line 66 after "and", delete "Z" and insert --$\overline{Z}$--
In column 5 at line 11 delete "12" and insert --$L_2$--
In column 6 at line 67 delete "(x,y,x)" and insert --(x,y,z)--
In column 9 at line 52 after "directions" delete "i" and insert --is--
In column 11 at line 14 after "yields" delete --in--
In column 14 at line 30 after "using" delete "to" and insert --the--

Signed and Sealed this

Thirtieth Day of March, 1999

*Attest:*

Q. TODD DICKINSON

*Attesting Officer*     *Acting Commissioner of Patents and Trademarks*